United States Patent
Pirzada et al.

(10) Patent No.: US 7,683,931 B2
(45) Date of Patent: Mar. 23, 2010

(54) IMAGE ARTIFACT DETECTION IN VIDEO QUALITY BENCHMARKS

(75) Inventors: Fahd Pirzada, Austin, TX (US); David Borel, West Chester, PA (US); Liam B. Quinn, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1049 days.

(21) Appl. No.: 11/368,716

(22) Filed: Mar. 6, 2006

(65) Prior Publication Data

US 2007/0216809 A1 Sep. 20, 2007

(51) Int. Cl.
*H04N 5/50* (2006.01)

(52) U.S. Cl. ........................................ 348/192
(58) Field of Classification Search ........................ None
See application file for complete search history.

(56) References Cited

U.S. PATENT DOCUMENTS

| | | | |
|---|---|---|---|
| 5,446,492 A | 8/1995 | Wolf et al. ................. 348/192 |
| 5,818,520 A * | 10/1998 | Janko et al. ................. 348/192 |
| 6,239,834 B1 * | 5/2001 | Miyaji et al. ................ 348/193 |
| 6,493,023 B1 * | 12/2002 | Watson ........................ 348/180 |
| 6,670,963 B2 | 12/2003 | Osberger ..................... 345/629 |
| 6,704,451 B1 | 3/2004 | Hekstra et al. .............. 382/199 |
| 6,734,898 B2 | 5/2004 | Zeidler ........................ 348/183 |
| 6,822,675 B2 | 11/2004 | Jung et al. ................... 348/180 |
| 6,992,697 B2 * | 1/2006 | Ali .............................. 348/189 |
| 7,394,483 B2 * | 7/2008 | Oka ............................ 348/181 |
| 2004/0075772 A1 | 4/2004 | Gu et al. ...................... 348/571 |
| 2004/0078733 A1 * | 4/2004 | Lewis .......................... 714/57 |
| 2004/0088726 A1 | 5/2004 | Ma et al. ...................... 725/46 |
| 2004/0114585 A1 | 6/2004 | Kraemer ..................... 370/366 |
| 2004/0153561 A1 | 8/2004 | Dalal et al. .................. 709/231 |
| 2004/0175056 A1 | 9/2004 | Lee ............................. 382/286 |
| 2005/0105802 A1 | 5/2005 | Hekstra et al. ............. 382/199 |
| 2005/0219362 A1 * | 10/2005 | Garoutte ..................... 348/180 |

* cited by examiner

*Primary Examiner*—Paulos M Natnael
(74) *Attorney, Agent, or Firm*—Hamilton & Terrile, LLP; Stephen A. Terrile

(57) ABSTRACT

A method for performing a video quality measurement which includes performing a video quality test on a frame of a user observed video clip to provide a video quality score, generating a weighted error matrix for the frame, and updating the video quality score based upon the weighted error matrix to provide a weighted video quality score is disclosed.

15 Claims, 3 Drawing Sheets

IMAGE ARTIFACT DETECTION IN VIDEO QUALITY BENCHMARKS

BACKGROUND OF THE INVENTION

1. Field of the Invention

The present invention relates to information handling systems, and more particularly to improving image artifact detection in video quality benchmarks.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One use of information handling systems is presenting video such as high-definition video. An issue relating to presenting high-definition video on information handling systems relates to when high-definition video is distributed across a network such as wired and wireless networks. To deliver products with the level of quality and clarity that customer's desire, it is desirable to provide video quality measurement tools that provide video quality information in addition to frames-per-second information.

There are a number of issues relating to providing meaningful video quality information. For example, meaningful video quality information should accurately reflect end user experience. There is a movement in the information handling industry to define a set of performance metrics that would more accurately reflect end user experience. Known video quality measurement tools assess image and motion quality but the image quality assessment does not truly reflect end user perception.

For example, end users perceive picture defects in perceptually salient screen areas more critically than those in less important regions. Known video quality measurement tools fail to consider the perceptual impact of a defect's location. For example, artifacts of similar intensity on an image yield the same video quality score whether the artifacts occur at the edge of the screen or over a perceptually important region.

Accordingly, it would be desirable to provide a video quality measurement that appreciates and quantifies a difference between mathematically similar artifacts that have different effects on user perception.

SUMMARY OF THE INVENTION

In accordance with the present invention, a video quality measurement tool and method that appreciates and quantifies a difference between mathematically similar artifacts that have different effects on user perception is set forth.

Mores specifically, in one embodiment, the invention relates to a method for performing a video quality measurement which includes performing a video quality test on a frame of a user observed video clip to provide a video quality score, generating a weighted error matrix for the frame, and updating the video quality score based upon the weighted error matrix to provide a weighted video quality score.

In another embodiment, the invention relates to an apparatus for performing a video quality measurement which includes means for performing a video quality test on a frame of a user observed video clip to provide a video quality score, means for generating a weighted error matrix for the frame, and means for updating the video quality score based upon the weighted error matrix to provide a weighted video quality score.

In another embodiment, the invention relates to a video quality measurement tool which includes a video quality test module, a weighted error matrix module, and an updating score module. The video quality test module performs a video quality test on a frame of a user observed video clip to provide a video quality score. The weighted error matrix module generates a weighted error matrix for the frame. The updating score module updates the video quality score based upon the weighted error matrix to provide a weighted video quality score.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
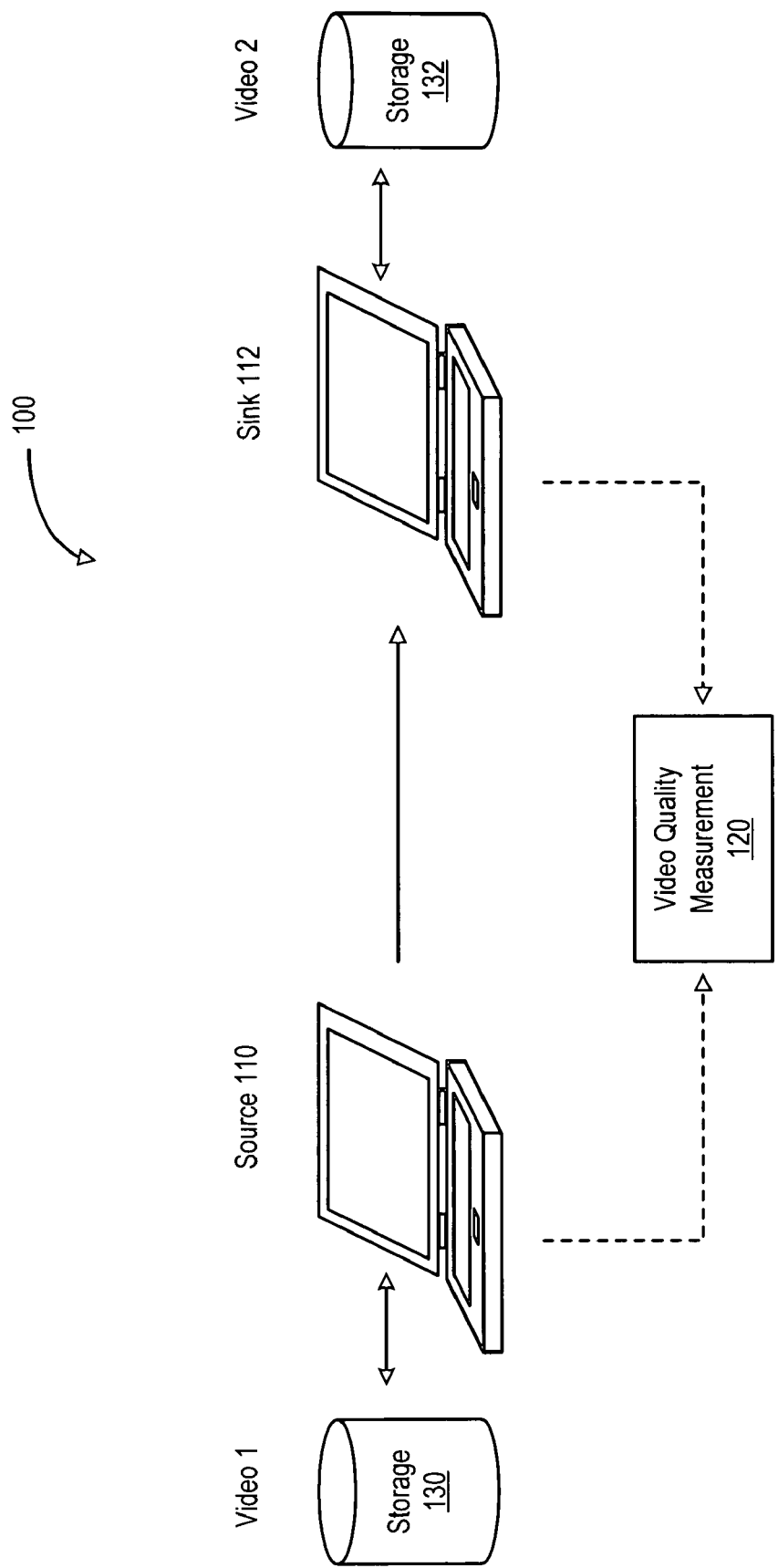
FIG. 1 shows a block diagram of an environment in which video quality measurement is performed.

Referring to FIG. 1, a block diagram of an environment 100 in which video quality measurement is performed is shown. The environment includes a source device 110 and a sink device 112 which are each coupled to a video quality measurement tool 120. The source device 110 is also coupled to a video storage device 130 and the sink device is coupled to a video storage device 132.

The video quality measurement tool 120 provides an improved scoring mechanism of video quality information. The video quality measurement tool 120 provides a post processing function that allows use of an existing video quality test to determine an initial score. The video quality measurement tool 120 then weights the initial assessment to provide video quality measurement information that reflects human visual perception.

More specifically, the video quality measurement tool 120 performs a comparison between two video clips that are provided by the storage devices 130, 132 to their respective information handling systems 120, 122. The resulting score is itemized to yield a time plot of visual impairments throughout the video clip. The video measurement tool then defines an error matrix for each frame comparison. The error matrix highlights impairments according to a mathematical severity of the impairment. An importance map is generated, based on motion, luminance contrast, color contrast, object size, object shape, people and faces, location within a scene, and camera focus. The severity of each error in the matrix is multiplied by the importance of the area error occupies within the presentation. This operation thus provides a weighted error matrix. The weighted error matrix is then used to provide a final video quality score. This final video quality score thus provides video quality measurement information that appreciates and quantifies a difference between mathematically similar artifacts that have different effects on user perception.

The image impairment caused by artifacts like blur and blockiness are weighted to reflect their impact on a scene. The perceptual importance of a particular screen area can be decided by a distance from the center of the screen and an amount of detail the image contains compared to the detail in surrounding areas. In a movie preview, for example, crisp white lettering at the center of the screen attracts more attention than the comparatively smooth scene unfolding behind it. Artifacts in highly distracting screen areas impact a quality score more than those in less obvious areas.

By providing the environment 100 with a means for determining a quality measurement scoring 'scale' value, enables information handling system manufacturers to provide further system design innovations. The video quality score also provides a useful customer benefit as a purchasing decision metric. For example, an information handling system manufacturer can use the scoring value to guide buyers' decisions including networking technologies to support streaming media; system configuration required to support playback of compressed/uncompressed audio/visual (AV) streams; an ability of portable devices to perform simultaneous encoding, decoding and display of AV streams with background workload.

Figure 2:
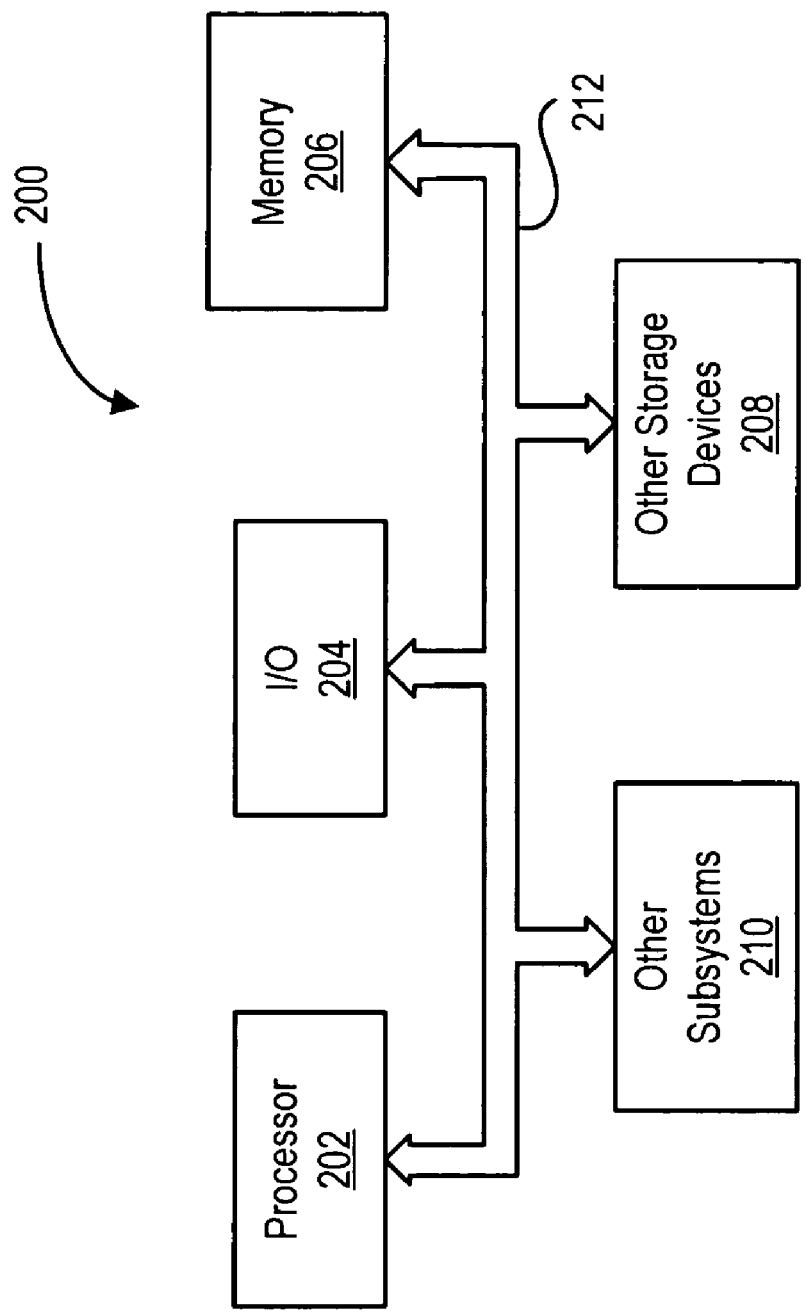
FIG. 2 shows a system block diagram of an information handling system.

Referring briefly to FIG. 2, a system block diagram of an information handling system 200 is shown. The source device 120 and the sink device 122 are each examples of an information handling system 200. The information handling system 200 includes a processor 202, input/output (I/O) devices 204, such as a display, a keyboard, a mouse, and associated controllers, non-volatile storage device 206 such as a hard disk drive, other storage devices 208, such as a floppy disk and drive and other memory devices, and various other subsystems 210, all interconnected via one or more buses 212.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 3:
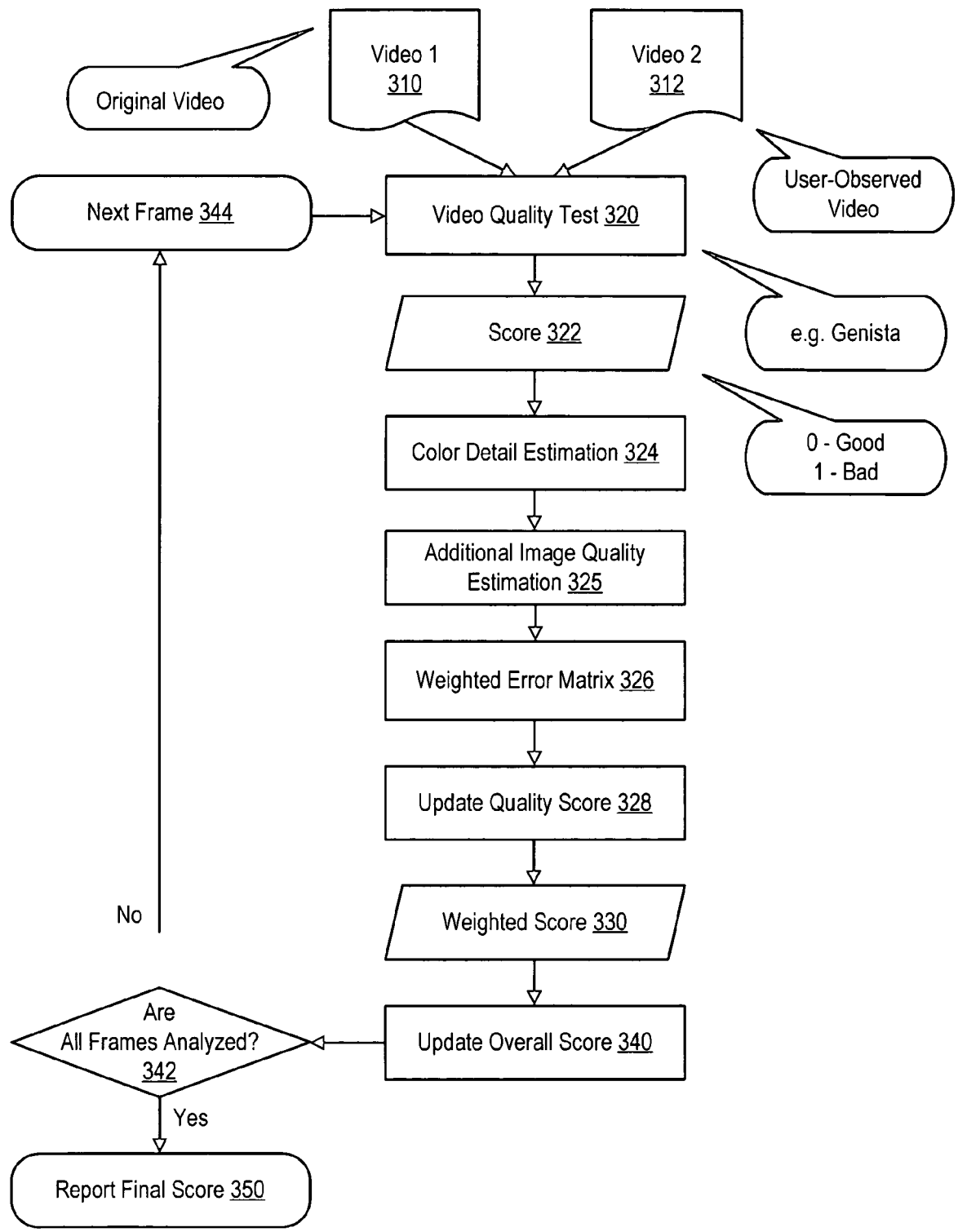
FIG. 3 shows a flow chart of the operation of a video quality measurement tool.

FIG. 3 shows a flow chart of the operation of a video quality measurement tool 120. More specifically, the video quality measurement tool 120 performs a comparison between two video clips (video 1 310 and video 2 312) that are provided by the storage devices 130, 132 to their respective information handling systems 120, 122. One of the video clips, e.g., video 1 is an original video clip and the other video clip, e.g., video 2, is a video clip that is presented by the sink information handling system 112 and is thus a perceived (i.e., user observed) video clip. The video quality measurement tool 120 then performs a video quality test on the video clips at step 320. The video quality test is any of a number of known video quality tests such as the test performed by the video quality management (VQM) tool by video quality expert group (VQEG). The VQM tool allows a comparison of two video clips based on various video quality metrics such as blockiness, jerkiness, blur, delay and jitter. This video quality test provides a video quality score at step 322.

By repeating this video quality test across the frames of the video clip, the resulting score is itemized to yield a time plot of visual impairments throughout the video clip.

After a video quality test is performed, the video measurement tool 120 then performs a color detail estimation of the frame at step 324. The color detail estimation quantifies elements within the frame that effect perception such as artifacts within the frame. The color detail estimation identifies color or edge transitions because these transitions can indicate a portion of the frame that is perceptually more important. The video measurement tool 120 may then perform additional image quality estimation at step 325. The additional image quality estimation includes performing other image quality estimation techniques if desired. The video measurement tool 120 then defines an error matrix for each frame comparison at step 326. The error matrix highlights impairments according to a mathematical severity of the impairment. An importance map is generated, based on motion, luminance contrast, color contrast, object size, object shape, people and faces, location within a scene, and camera focus. The severity of each error in the matrix is multiplied by the importance of the area error occupies within the presentation. This operation thus provides a weighted error matrix. The weighted error matrix is then used to provide an updated quality core at step 328.

The updated quality score is then used to provide a weighted score at step 330. The weighted score is then used to update an overall video quality score at step 340. The video measurement tool 120 then analyzes the video clip to determine whether all of the frames of the video clip have been analyzed at step 342. If all of the frames have not been analyzed, then the video measurement tool 120 obtains the next frame to be analyzed at step 344 and the video quality test is performed on the next frame at step 320. Thus, the tool 120 provides an updated quality score which is updated over time.

If all of the frames have been analyzed, then the video measurement tool 120 reports a final score at step 350. This final video quality score thus provides video quality measurement information that appreciates and quantifies a difference between mathematically similar artifacts that have different effects on user perception. This video quality measurement information is applicable based upon an assumption that the frames of video 1 and 2 are in the correct sequence (i.e., there are no sequencing errors between video 1 and video 2). If there are sequencing errors involved during the transmission of video across a network, the video measurement tool 120 may use various tools to track and report such sequencing errors. However, in one embodiment, the final score 350 does not incorporate the effect of sequencing errors.

The final score can thus be used to as part of a tool that informs a user of the capabilities of their particular information handling system. The final score can be analyzed based upon what else is executing on the information handling system. This can then be used by a user to determine how to improve the perceived video quality. The final score provides an objective representation of user perception of video quality.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Also for example, a similar iterative estimation process may be used whereby the severity of sequencing errors can be tracked depending on how drastic of an impact the sequencing errors had on the user experience. Accordingly, the video measurement tool 120 may include a module to detect and quantify sequencing errors.

Consequently, the invention is intended to be limited only by the spirit and scope of the appended claims, giving full cognizance to equivalents in all respects.

What is claimed is:

1. A method for performing a video quality measurement comprising:
   performing a video quality test on a frame of a user observed video clip to provide a video quality score;
   generating a weighted error matrix for the frame, the weighted error matrix highlighting impairments according to a mathematical severity of an impairment, the generating the weighted error matrix comprising
   generating an importance map based on motion, luminance contrast, color contrast, object size, object shape, people and faces, location within a scene, and camera focus; and,
   multiplying a severity of each error in the matrix by the importance of an area an error occupies within the presentation; and,
   updating the video quality score based upon the weighted error matrix to provide a weighted video quality score.

2. The method of claim 1 further comprising:
   repeating the performing, generating and updating on a plurality of frames within the user observed video clip; and,
   generating an overall weighted video quality score based upon the repeating.

3. The method of claim 1 further comprising:
   performing a color detail estimation on the frame of the user observed video clip; and,
   using the color detail estimation when generating the weighted error matrix.

4. The method of claim 3 wherein:
   the color detail estimation identifies color transitions within the frame.

5. The method of claim 3 wherein:
   the color detail estimation identifies edge transitions within the frame.

6. An apparatus for performing a video quality measurement comprising:
   means for performing a video quality test on a frame of a user observed video clip to provide a video quality score;
   means for generating a weighted error matrix for the frame, the weighted error matrix highlighting impairments according to a mathematical severity of an impairment, the means for generating the weighted error matrix comprising
   means for generating an importance map based on motion, luminance contrast, color contrast, object size, object shape, people and faces, location within a scene, and camera focus; and,
   means for multiplying a severity of each error in the matrix by the importance of an area an error occupies within the presentation; and,
   means for updating the video quality score based upon the weighted error matrix to provide a weighted video quality score.

7. The apparatus of claim 6 further comprising:
   means for repeating the performing, generating and updating on a plurality of frames within the user observed video clip; and,
   means for generating an overall weighted video quality score based upon the repeating.

8. The apparatus of claim 6 further comprising:
   means for performing a color detail estimation on the frame of the user observed video clip; and,
   means for using the color detail estimation when generating the weighted error matrix.

9. The apparatus of claim 8 wherein:
   the color detail estimation identifies color transitions within the frame.

10. The apparatus of claim 8 wherein:
    the color detail estimation identifies edge transitions within the frame.

11. A video quality measurement tool comprising:
    a video quality test module, the video quality test module performing a video quality test on a frame of a user observed video clip to provide a video quality score;
    a weighted error matrix module, the weighted error matrix module generating a weighted error matrix for the frame, the weighted error matrix highlighting impairments according to a mathematical severity of an impairment, the generating the weighted error matrix module comprising instructions for generating an importance map based on motion, luminance contrast, color contrast, object size, object shape, people and faces, location within a scene, and camera focus; and, multiplying a severity of each error in the matrix by the importance of an area an error occupies within the presentation; and, an updating score module, the updating score module updating the video quality score based upon the weighted error matrix to provide a weighted video quality score.

12. The video quality measurement tool of claim 11 further comprising:

a repeating module, the repeating module repeating the performing, generating and updating on a plurality of frames within the user observed video clip; and, an overall weighted video quality score module, the overall weighted video quality score module generating an overall weighted video quality score based upon the repeating.

13. The video quality measurement tool of claim 11 further comprising:

a color detail estimation module, the color detail estimation module performing a color detail estimation on the frame of the user observed video clip; and, wherein the weighted error matrix module uses the color detail estimation when generating the weighted error matrix.

14. The video quality measurement tool of claim 13 wherein:

the color detail estimation identifies color transitions within the frame.

15. The apparatus of claim 13 wherein:

the color detail estimation identifies edge transitions within the frame.

* * * * *